(12) United States Patent
Sato et al.

(10) Patent No.: US 7,310,127 B2
(45) Date of Patent: Dec. 18, 2007

(54) LCD DEVICE AND LCD PROJECTOR

(75) Inventors: Yuko Sato, Tokyo (JP); Jin Matsushima, Tokyo (JP); Mitsuhiro Sugimoto, Tokyo (JP); Ken Sumiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 245 days.

(21) Appl. No.: 10/901,206

(22) Filed: Jul. 29, 2004

(65) Prior Publication Data

US 2005/0024576 A1    Feb. 3, 2005

(30) Foreign Application Priority Data

Jul. 31, 2003   (JP)   ............... 2003-283668

(51) Int. Cl.
*G02F 1/1333*   (2006.01)
(52) U.S. Cl. .................. 349/158; 349/117; 349/118; 349/119
(58) Field of Classification Search ........... 349/158, 349/117–119
See application file for complete search history.

(56) References Cited

U.S. PATENT DOCUMENTS 4,643,530 A * 2/1987 Yamazaki .................. 349/43
6,654,083 B1 * 11/2003 Toda et al. .................. 349/110
6,788,377 B1 * 9/2004 Ogawa et al. ............... 349/151

FOREIGN PATENT DOCUMENTS

| JP | H09-113906 A | 5/1997 |
|---|---|---|
| JP | H11-149071 A | 6/1999 |
| JP | 2001-042279 A | 2/2001 |

* cited by examiner

*Primary Examiner*—David Nelms
*Assistant Examiner*—(Nancy) Thanh Nhan P Nguyen
(74) *Attorney, Agent, or Firm*—Sughrue Mion Pllc.

(57) ABSTRACT

An LCD device in an LCD projector includes a TFT substrate, a counter substrate, an LC layer sandwiched between the TFT substrate and the counter substrate, and a pair of compensation substrates attached onto the outer surfaces of the TFT substrate and the counter substrate far from the LC layer. The compensation substrate has a negative coefficient of thermal expansion (CTE) for compensating the retardation caused by a temperature rise of the TFT substrate and the counter substrate due to irradiation thereof by a light source.

16 Claims, 6 Drawing Sheets

LCD DEVICE AND LCD PROJECTOR

BACKGROUND OF THE INVENTION (a) Field of the Invention

The present invention relates to an LCD (liquid crystal display) device and an LCD projector including the LCD device.

(b) Description of the Related Art

An LCD projector includes a light source, and an LCD device used as a light valve having a function for controlling transmittance of the light emitted from the light source. The LCD projector projects an enlarged image of the light transmitted through the LCD device onto a screen. The LCD device has an LC layer, and a pair of polarizing plates having polarization axes perpendicular to each other. The LC layer controls the polarized direction of the incident light to pass through the polarizing plate the light needed to display the image.

The LC layer controlling the polarized direction of the transmitted light is sandwiched between a TFT (thin-film-transistor) substrate and a counter substrate. The TFT substrate includes a transparent substrate mounting thereon an array of TFTs, pixel electrodes each corresponding to one of the TFTs, and drive circuits for driving the array of the TFTs. The counter substrate includes a transparent substrate mounting thereon a counter electrode. The TFT substrate and the counter substrate sandwich therebetween the LC layer so that the surfaces of the TFT substrate and the counter substrate on which respective electrodes are formed oppose each other.

The thicknesses of the TFT substrate and the counter substrate are as small as about 0.5 to 1.2 mm. Thus, even the outer surfaces (i.e., the sides far from the LC layer) of the TFT substrate and the counter substrate are located in the vicinity of the LC layer, on which the transmitted light is focused. This renders a damage or dust, if any, on the outer surface of the substrate to be projected onto the screen as an image, thereby degrading the image quality of the LCD projector. For preventing the image degradation, a pair of dustproof glass plates (or dustproof substrates) are bonded onto the respective substrates, the dustproof glass plates having a thickness of around 0.5 to 1.2 mm, to prevent generation of the damage or attachment of the dust. This thickness of the dustproof glass plate allows the damage or dust on the dustproof glass plate to be well apart from the LC layer, thereby suppressing the influence by the damage or dust on the image quality.

An up-to-date LCD projector is requested to have a higher luminance in view of a bright room in which the image is projected and observed. This requests the light source of the LCD projector to have a higher luminance. In general, the LCD device is heated by the incident light due to absorption thereof, wherein a higher intensity of the incident light causes a higher temperature rise. If a large temperature difference arises between the central area and the peripheral area of the LCD device, a stress is generated within the TFT substrate, counter substrate or dustproof substrate constituting the LCD device. This stress renders the birefringence of the substrate material to generate retardation, wherein the light transmitted at the portion of the substrate applied by the stress has a phase deviation. The retardation, if generated, causes part of the polarized light to pass through the polarized plate upon display of a black color, thereby generating an "undesirable light pass" phenomenon. The undesirable light pass reduces the contrast ratio of the image projected on the screen, thereby degrading the image quality of the LCD projector.

In the mean time, the conventional LCD device includes a TFT substrate made of a quartz glass having a higher heat tolerance because TFTs are formed on the transparent TFT substrate by using a high-temperature polysilicon technique. The quartz substrate has a lower coefficient of thermal expansion (CTE) of $0.56 \times 10^{-6}$/K and thus shows a lower retardation caused by a temperature rise. However, the material for the quartz glass is extremely expensive and has a smaller sheet size, which means a smaller number of TFT substrates being obtained from a single sheet of quartz glass. For example, considering that 1-inch LCD devices are to be manufactured from a 6-inch wafer, the number of 1-inch LCD devices obtained therefrom is only 19 at most. This raises the cost of the LCD devices.

In view of the above, a low-temperature polysilicon technique is increasingly employed for manufacturing the LCD device, wherein TFTs are formed at a lower temperature. This means that an inexpensive glass such as non-alkali glass can be used for the TFT substrate. However, the inexpensive glass generally has a higher CTE and thus exhibits a higher retardation caused by the birefringence.

Patent Publication JP-A-2001-042279 describes a technique for suppressing the retardation by using a substrate having a lower CTE. FIG. 10 shows the LCD device described in this publication, which includes an LC layer 104, TFT substrate 102 and counter substrate 103 sandwiching therebetween the LC layer 104, and dustproof substrates 105 and 106 attached onto the outer surfaces of the TFT substrate 101 and the counter substrate 102, respectively. The polarizing plates are disposed apart from the LCD device in an LCD projector and thus not depicted in this figure. The counter substrate 103 mounts thereon a counter electrode and a micro-lens for focusing the incident light. In this structure, each of the TFT substrate 102, counter substrate 103, and dustproof substrates 105 and 106 is made of a glass having a lower CTE, as low as $1 \times 10^{-6}$/K or lower in the absolute value thereof.

Patent Publication JP-A-9-113906 describes another technique for suppression of the retardation. FIG. 11 shows the LCD device described in the publication, which includes an LC layer 114, TFT substrate 112 and counter substrate 113 sandwiching therebetween the LC layer 114, heat radiation substrates 115 and 116 attached onto the outer surfaces of the TFT substrate 112 and the counter substrate 113. Each of the heat radiation substrates 115 and 116 is made of a quartz glass or heat-tolerance glass having a coefficient of thermal conductivity (CTC) of not lower than 1 W/m·K. The heat radiation substrates 115 and 116 also act as dustproof substrates. The heat radiation substrates 115 and 116 assist or accelerate heat radiation to reduce the temperature difference between the central area and the peripheral area of the LCD device 111, thereby suppressing the retardation.

Patent Publication JP-A-11-149071 describes a technique for suppressing the retardation by using a compensation substrate having a photoelastic coefficient which has a sign opposite to the sign of those of the TFT substrate and the counter substrate. FIG. 12 shows the LCD device described therein, which includes an LC layer 124, TFT substrate 122 and counter substrate sandwiching therebetween the LC layer 124, and compensation substrate 125 and micro-lens substrate 126 attached onto the outer surfaces of the TFT substrate 122 and the counter substrate 123, respectively. The micro-lens substrate 126 has thereon a micro-lens for focusing the incident light. It is recited in the publication that each of the TFT substrate 122, counter substrate 123 and micro-lens substrate 126 is made of a glass having a positive photoelastic coefficient, whereas the compensation substrate 125 is made of acrylic resin having a negative photoelastic coefficient.

In the configuration of the LCD device described in JP-A-11-149071, upon generation of a temperature difference, the light transmitted through the compensation substrate 125 having a negative photoelastic coefficient has a phase deviation opposite to the phase deviation caused by the TFT substrate 125 and counter substrate 123. That is, the compensation substrate 125 cancels the retardation caused by the TFT substrate 122 and counter substrate 123.

In the LCD device 101 described in JP-A-2001-042279, all the substrates have lower CTEs of not higher than $1 \times 10^{-6}$/K for suppression of the stress. This causes a higher cost for the LCD device due to expensive substrate materials. In addition, even the low-CTE glass cannot sufficiently reduce the retardation, whereby there remains some retardation in the respective substrates. A larger number of the substrates cause larger cumulative retardation, thereby causing degradation of the image quality due to the undesirable light pass. In particular, the degradation of the image quality is more noticeable in the case of a higher-luminance LCD projector having a luminance of 3000 ANSI lumen.

In the LCD device 111 described in JP-A-9-113906, a low-cost LCD device can be obtained by using an inexpensive glass for the TFT substrate. However, the heat radiation efficiency of the quartz glass or heat-tolerance glass used as the heat radiation substrates is not sufficient in the case of the glass having a higher CTE, unable to sufficiently suppress the undesirable light pass caused by the retardation. In particular, the degradation of the image quality is more noticeable in the case of a higher-luminance LCD projector having a luminance of 3000 ANSI lumen.

In the LCD device 121 described in JP-A-11-149071, the materials having negative photoelastic coefficients are limited, whereby the design choice for the substrate material is narrow. This impairs reduction of the cost for the substrate material and thus provision of a lower-cost LCD device.

SUMMARY OF THE INVENTION

In view of the above problems in the conventional techniques, it is an object of the present invention to provide an LCD device capable of being manufactured with a lower cost, having a wider design choice for the substrate materials and capable of maintaining a higher image quality of an LCD projector even in the case of a higher-luminance light being incident to achieve an image display at a luminance of 3000 ANSI lumen or above in the LCD projector.

The present invention also provides an LCD projector including such an LCD device.

Th present invention provides a liquid crystal display (LCD) device including: a TFT substrate including a transparent substrate mounting thereon thin film transistors; a counter substrate opposing said TFT substrate, a liquid crystal (LC) layer sandwiched between said TFT substrate and said counter substrate; and a compensation substrate disposed adjacent to a surface of one of said TFT substrate and said counter substrate, which is far from said LC layer, wherein said compensation substrate has a CTE having a sign opposite to that of a CTE of said transparent substrate.

The present invention also provides LCD projector including the LCD device of the present invention.

In accordance with the LCD device of the present invention, due to the compensation substrate having a CTE having a sign opposite to the sign of the CTE of the transparent substrate, the temperature rise of the LCD device caused by the transmitted light generates opposite stresses, i.e., a tensile stress and a compressive stress, on the compensation substrate and the transparent substrate. Thus, the light transmitted through the compensation substrate has a phase deviation opposite to the phase deviation of the light transmitted through the transparent substrate, thereby canceling the retardation caused by the transparent substrate.

Thus, in the LCD device of the present invention, the retardation is not accumulated, the undesirable light pass is prevented, and an excellent contrast ratio can be obtained, whereby an excellent image quality can be obtained. Even if a higher-luminance image of not lower than 3000 ANSI lumen is to be displayed, the light passing through the compensation substrate has a larger phase deviation to cancel the larger phase deviation caused by the light passing through the transparent substrate, thereby effectively canceling the larger retardation.

In addition, since the combinations of the substrate materials having opposite signs for the CTE are relatively abundant in the market, the design choice for the substrate materials is wide. The retardation generated in the substrate is determined by the product of the photoelastic coefficient of the substrate, the magnitude of the stress within the substrate, and the thickness of the substrate, wherein the magnitude of the stress within the substrate is in proportion to the CTE of the substrate. Accordingly, the combination of the substrates having opposite signs of CTEs should preferably have the same sign of the photoelastic coefficients, because opposite signs of the photoelastic coefficients add the retardation.

The compensation substrate may be implemented by the counter substrate itself, by using a negative-CTE glass, for example, for the counter substrate.

The above and other objects, features and advantages of the present invention will be more apparent from the following description, referring to the accompanying drawings.

PREFERRED EMBODIMENTS OF THE INVENTION

Now, the present invention is more specifically described with reference to accompanying drawings.

Figure 1:
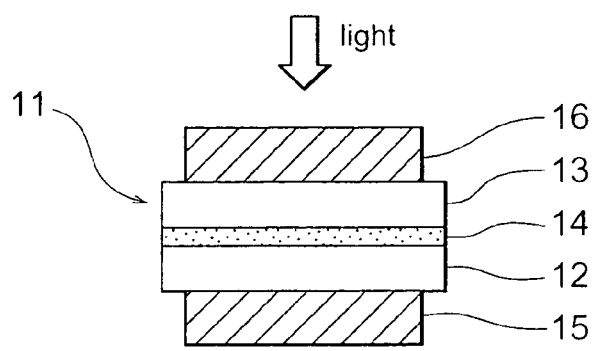
FIG. 1 is a side view of an LCD device according to a first embodiment of the present invention.

Referring to FIG. 1, an LCD device, generally designated by numeral 11, according to a first embodiment of the present invention includes a transparent TFT substrate 12 mounting thereon TFTs, drive circuits and pixel electrodes, a transparent counter substrate 13 mounting thereon a counter electrode, an LC layer 14 sandwiched between the TFT substrate 12 and the counter substrate 13, and a pair of compensation substrates 15 and 16 each attached onto a corresponding substrate 12 or 13. The TFT substrate 12 and the counter substrate 13 are disposed so that the substrate surfaces mounting thereon the respective electrode layers oppose each other.

Each compensation substrate 15 or 16 is bonded onto the outer surface of the corresponding one of the TFT substrate 12 and the counter substrate 13 far from the LC layer 14, by using a soft adhesive, to form an integrated member. More specifically, compensation substrate 15 is bonded onto the light-exiting side of the TFT substrate to form an integrated member, whereas the compensation substrate 16 is bonded onto the light-incident side of the counter substrate 13 to form an integrated member. The adhesive used herein is of a gel type having a penetration factor of around 80. The gel-type adhesive alleviates the stress applied between the bonded substrates, thereby preventing warp etc. of the LCD device to maintain the image quality. The penetration factor of the adhesive may be preferably between 60 and 100.

The LCD device of FIG. 1 is manufactured as follows. First, the TFT substrate 12 and the counter substrate 13 are bonded together to sandwich therebetween the LC layer 14, thereby obtaining a base panel. Adhesive is then dropped and applied onto the light-incident side of the counter substrate 13 of the base panel, followed by mounting thereon the compensation substrate 16, leaving the compensation substrate 16 on the base panel for one hour in a vacuum oven, and introducing the resultant panel into a clean oven to cure the adhesive. Thus, the LCD device of FIG. 1 is obtained. It is to be noted that the adhesive may be cured in the vacuum oven.

By performing the bonding process in the vacuum oven, air bubbles are not left between the bonded substrates, thereby achieving an excellent image quality without the skill of an expert.

In an LCD projector having the LCD device 11 according to the present embodiment, polarized light enters the LCD device at the side of the compensation substrate 16, and passes the LCD device in the order of the compensation substrate 16, counter substrate 13, LC layer 14, TFT substrate 12 and compensation substrate 15.

In the present embodiment, each of the TFT substrate 12 and the counter substrate 13 is made from a 0.7-mm-thick non-alkali glass having a CTE of $+3.8 \times 10^{-6}$/K. This non-alkali glass is generally used as a standard inexpensive glass for the LCD device, on which high-performance TFTs are formed by using a low-temperature polysilicon process.

The LCD device of the present embodiment can be manufactured from a glass plate having a size of 360×460 mm, from which a large number of LCD devices are obtained by a suitable layout thereon to reduce the cost for the LCD devices. Such a glass plate can be obtained at a lower cost so long as the glass plate is 1.1-mm thick or below. Each compensation substrate 15 or 16 is made from a negative-CTE glass having a CTE of $-2.0 \times 10^{-6}$/K and a thickness of 1.1 mm. The details of glass materials are presented in this text for an exemplification purpose in the present embodiment and other embodiments to follow.

Figure 2A:
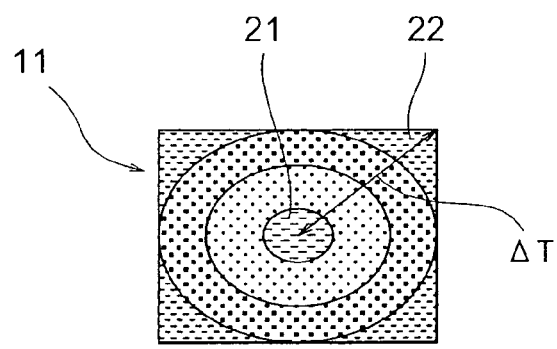
FIG. 2A is a schematic top plan view of the LCD device of FIG. 1 for showing a temperature distribution thereof when used in an LCD projector.
Figure 2B:
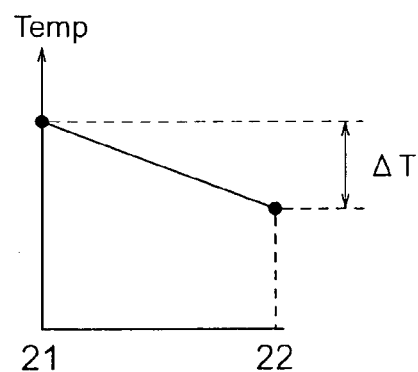
FIG. 2B is a graph showing the temperature distribution profile of FIG. 2A.

After the LCD device of the present embodiment was installed in a high-luminance LCD projector, the LCD device absorbed the light from the light source to be heated thereby. In the heated state, the LCD device had a temperature distribution wherein the LCD device had a higher temperature in the central area 21 thereof, and a lower temperature in the peripheral area 22 thereof, as shown in FIGS. 2A and 2B. In this example, the temperature difference $\Delta T$ was about 15 degrees C. In this temperature distribution, there was substantially no temperature difference between the substrates of the LCD device, because the TFT substrate 12, counter substrate 13, and the compensation substrates 15 and 16 are formed as an integral member.

The temperature difference $\Delta T$ between the central area and the peripheral area generates a stress within each substrate, thereby causing the birefringence of the each substrate to generate retardation in the transmitted light. The LCD devices described in JP-A-2001-042279 and -9-113906 suffer from a partial undesirable light pass upon projection of the image onto the screen. The undesirable light pass is especially larger in the area of the maximum angle with respect to the polarizing axis, whereby the image on the screen has a lower contrast ratio and a larger range of variation in the level of the black luminance to thereby degrade the image quality. The term "black luminance" as used herein means a luminance of the screen upon display of a black color.

In the present embodiment, the compensation substrates 15 and 16 disposed on the outer surfaces of the TFT substrate 12 and the counter substrate 13, respectively, have a CTE having a sign opposite to the sign of the CTEs of the TFT substrate 12 and the counter substrate 13. Thus, the compensation substrates 15 and 16 cancel the phase deviations caused by the TFT substrate 12 and the counter substrate 13, respectively, by the opposite phase deviations for achieving optical compensation of the retardation.

The magnitude of retardation generated changes depending on the stress, i.e., the CTE and the thickness of the transparent substrate. A larger stress, a larger CTE or a larger thickness increases the retardation. Accordingly, for achieving an excellent image quality without degradation of the contrast ratio during the image display, the CTEs and thicknesses of the substrates are determined so that the TFT substrate 12, counter substrate 13 and compensation substrates 15 and 16 have excellent compensation relationships among them. To this purpose, it is sufficient to select a specific value or below for the total sum of the products of the CTE and the thickness of each substrate constituting the LCD device. In other words, the total sum of the retardations generated by the substrates should be a specified value or below.

If the range of variation in the level of the black luminance on the screen is estimated at 0.1 or below, it may be evaluated as a suitable display performance substantially without reduction of the contrast ratio. The "level of black luminance" as used herein is obtained by measuring the luminance (first luminance) on the screen at each specific point of the screen while displaying black thereon by using the LCD device applied with no voltage, for example, and normalizing the measured first luminance by a second luminance obtained by measuring at the each specific point while irradiating the screen with the light source through a reference glass having no pattern thereon. The level of the black luminance is measured on the screen at nine positions including the center thereof, four corners thereof and middle points between the center and the respective corners of the screen. The range of variation in the level of the black luminance is calculated as a difference between the maximum and the minimum of the nine normalized luminances thus obtained.

Figure 13:
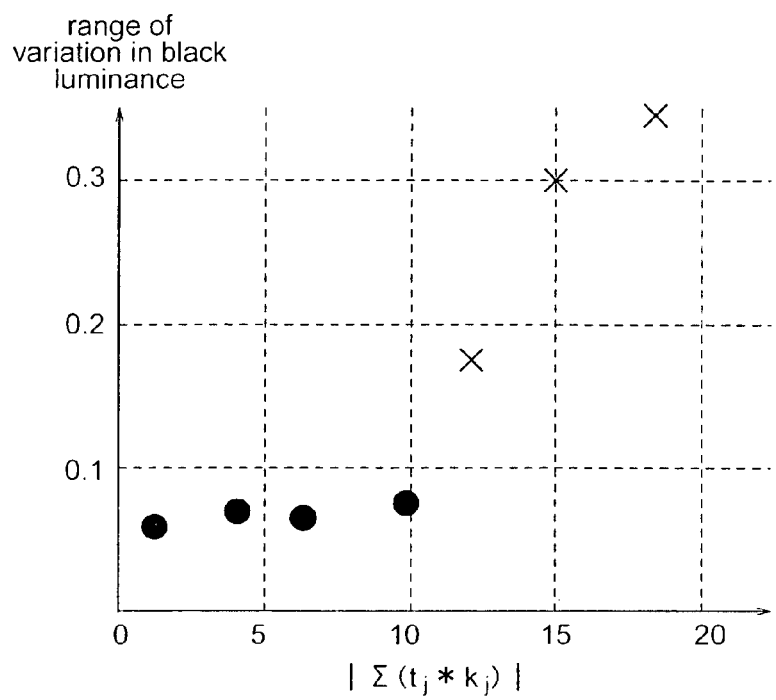
FIG. 13 is a graph exemplifying the relationship between the range of variation in the level of the black luminance and $|\Sigma(t_j \times k_j)|$ in an LCD device according to the present invention.

FIG. 13 shows the range of variation in the level of the black luminance versus the total sum of the products for the substrates ($|\Sigma t_j \times k_j|$), each of the products for the substrates being obtained by multiplying the CTE ($k_j \times 10^{-6}$/K) by the thickness ($t_j$ mm) of each of the substrates.

The results shown in FIG. 13 were obtained from the LCD device of the present embodiment including a TFT substrate and a counter substrate both made from a standard glass for the typical LCD device, and compensation substrates 15 and 16 compensating the retardation. As understood from FIG. 13, assuming that the number of substrates is "n" and the thickness and the CTE of each j-th substrate (j=1, 2, ... n) are $k_j \times 10^{-6}$/K and $t_j$ mm, respectively, a suitable display performance can be obtained in the case where the following relationship:

$$|t_1 \cdot k_1 + t_2 \cdot k_2 + \ldots + t_n \cdot k_n| = |\Sigma t_j \times k_j| \leq 10 \quad (1)$$

is satisfied.

In the present embodiment, n=4 and the values of the left side of the formula (1) was 0.92, thereby satisfying the relationship (1). The range of variation in the level of the black luminance in the graph of FIG. 13 was 0.08, thereby achieving an excellent image quality without an undesirable light pass.

As described above in connection with the present embodiment, the compensation substrates 15 and 16 compensate the retardation generated in the LCD device to achieve an excellent image quality, while using an inexpensive non-alkali glass as the material for the TFT substrate. The glass for the TFT substrate is not limited to the non-alkali glass, and may be another inexpensive glass.

The glass used for the compensation substrates may be replaced by another glass so long as the compensation substrates made of the another glass satisfy the relationship (1). The number of compensation substrates is not limited to the exemplified number (two). For example, a single compensation substrate may be provided on the TFT substrate or counter substrate so long as the single compensation substrate has a sufficient thickness so that the relationship (1) is satisfied.

It is to be noted that if the CTE of the counter substrate has a sign opposite to the sign of the CTE of the TFT substrate, the counter substrate has a function for compensating the retardation instead of the compensation substrates.

Figure 3:
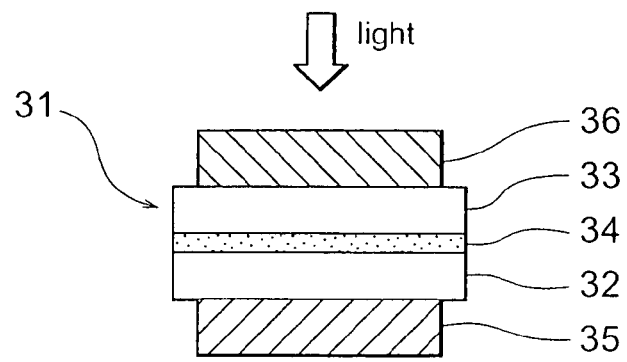
FIG. 3 is a side view of an LCD device according to a second embodiment of the present invention.

FIG. 3 shows an LCD device, generally designated by numeral 31, according to a second embodiment of the present invention. The LCD device 31 of the present embodiment is similar to the LCD device of the first embodiment except that a heat radiation substrate 36 is attached onto the light-incident side of the counter substrate 33 in the present embodiment, instead of the compensation substrate 16 in the first embodiment.

Each of the TFT substrate 32 and the counter substrate 33 is made from a 0.7 mm-thick non-alkali glass having a CTE of +3.8×10$^{-6}$/K. The non-alkali glass having a thickness of not more than 1.1 mm can be obtained at a low cost. The compensation substrate 35 attached onto the light-exiting side of the TFT substrate 32 is made from a negative-CTE glass having a CTE of −2.0×10$^{-6}$/K and a thickness of 1.1 mm. The heat radiation substrate 36 is made from a high-thermal-conductivity glass having a CTC of 14 W/m·K and a thickness of 1.1 mm. The glass for the heat radiation substrate should preferably have a CTC of 10 W/m·K or above.

An LCD projector having the LCD device 31 of the present embodiment had a lower temperature difference ΔT of about 5 degrees C. between the central area and the peripheral area. The heat radiation substrate 36 suppressed the temperature difference ΔT, allowing a wider design choice of the substrate materials satisfying the relationship (1).

Figure 14:
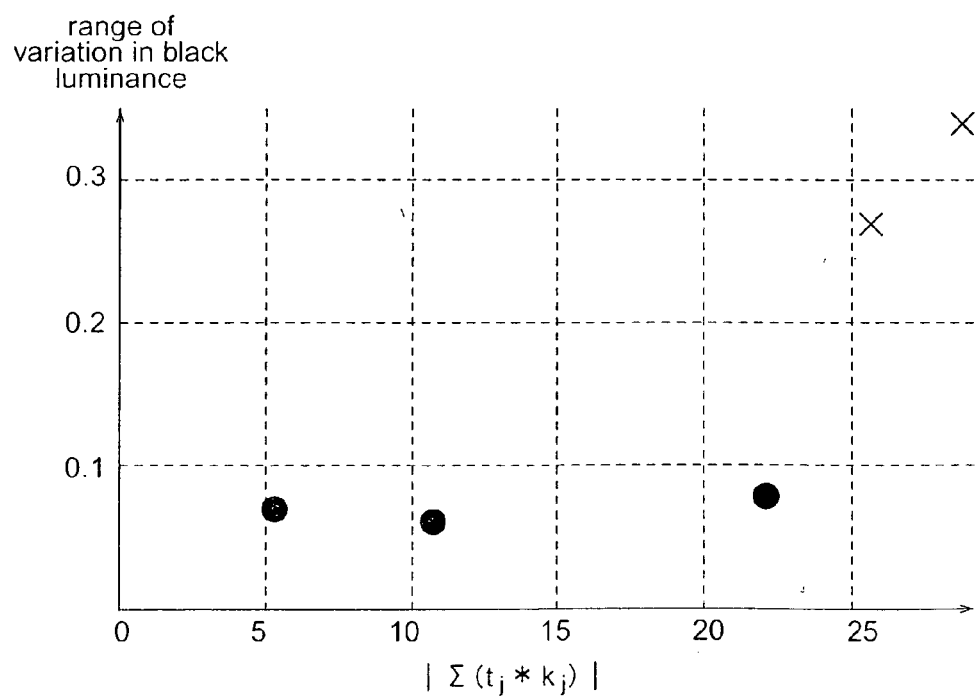
FIG. 14 is a graph exemplifying the relationship between the range of variation in the level of the black luminance and $|\Sigma(tj \times kj)|$ in another LCD device according to the present invention.

FIG. 14 shows the range of variation in the level of the black luminance versus the total sum of the products for the substrates ($|\Sigma t_j \times k_j|$), which is obtained in the test using the present embodiment, similarly to FIG. 13. In this example, the TFT substrate and the counter substrate are made from a standard glass for the typical LCD device. The LCD device included the compensation substrate and the heat radiation substrate.

As understood from FIG. 14, assuming that the number of substrates is "n" and the thickness and the CTE of j-th substrate (j=1, 2, . . . , n) are $k_j \times 10^{-6}$/K and $t_j$ mm, respectively, the suitable display performance can be obtained in the case where the following relationship:

$$|t_1 \cdot k_1 + t_2 \cdot k_2 + \ldots + t_n \cdot k_n| = |\Sigma t_j \times k_j| \leq 24 \quad (2)$$

is satisfied for the present embodiment including the heat radiation substrate 36.

In the present embodiment, n=4 and the values of the left side of the formula (2) is 11.92, thereby satisfying the relationship (2). The range of variation in the level of the black luminance in the graph of FIG. 14 was 0.07, thereby achieving an excellent image quality without an undesirable light pass.

As described in connection with the present embodiment, the heat radiation substrate 36 suppresses the temperature rise of the LCD device even if light having a higher intensity is incident onto the LCD device. The glass for the TFT substrate and the counter substrate is not limited to the non-alkali glass, and may be another inexpensive glass.

The glass used for the compensation substrates may be replaced by another glass so long as the compensation substrates made of the another glass satisfy the relationship (2). In the present embodiment, a compensation substrate and a heat radiation substrate are provided on the TFT substrate and the counter substrate, respectively; however, one of the compensation substrate and the heat radiation substrate may be sufficient so long as the compensation substrate or heat radiation substrate has a sufficient thickness so that the relationship (2) is satisfied.

It is to be noted that if the counter substrate, for example, has a function of compensating the retardation or radiating the heat, the compensation substrate and/or the heat radiation substrate need not be provided for achieving the advantages of the present invention.

Figure 4:
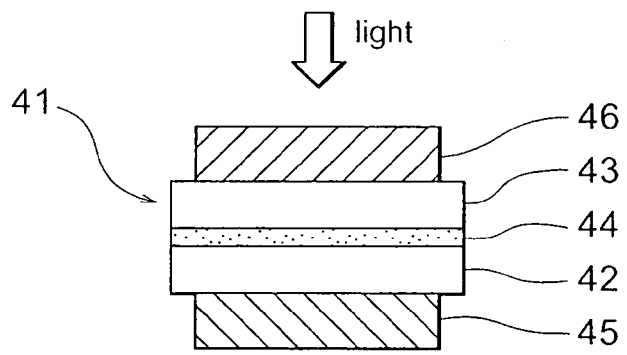
FIG. 4 is a side view of an LCD device according to a third embodiment of the present invention.

FIG. 4 shows an LCD device, generally designated by numeral 41, according to a third embodiment of the present invention. The LCD device of the present embodiment is similar to the second embodiment except that the locations of the compensating substrate 46 and the heat radiation substrate 45 are reversed from those in the second embodiment.

Each of the TFT substrate 42 and the counter substrate 43 is made from a 0.7-mm-thick non-alkali glass having a CTE of $+3.8 \times 10^{-6}$/K. The compensating substrate 46 is made from a 1.1-mm-thick negative-CTE glass having a CTE of $-2.0 \times 10^{-6}$/K, whereas the heat radiation substrate 45 is made from a 1.1-mm-thick high-thermal-conductivity glass having a CTE of $8.0 \times 10^{-6}$/K and a thermal conductivity of 14 W/m·k.

In an LCD projector having the LCD device of the present embodiment, it was confirmed that the temperature difference between the central area and the peripheral area of the LCD device was about 5 degrees C. The heat radiation substrate 45, as provided in the resent embodiment similarly to the second embodiment, suppressed the temperature difference ΔT to a lower temperature compared to the first embodiment. In addition, the range of variation in the level of the black luminance was 0.07, achieving a satisfactory image quality substantially without the undesirable light pass.

In the present embodiment, the heat radiation substrate 45 suppresses the temperature rise even in the case of a higher intensity of the transmitted light, thereby achieving an excellent image quality. The glass used for the TFT substrate 42 and the counter substrate 43 is not limited to the non-alkali glass. The glasses used for the compensation substrate 46 and the heat radiation substrate 45 are only examples, and may be replaced by other glasses so long as the other glasses have CTEs and thicknesses that satisfy the relationship (2). Although the compensation substrate 46 and the heat radiation substrate 45 are disposed on the TFT substrate 42 and the counter substrate 43, respectively, both the compensation substrate 46 and the heat radiation substrate 45 may be disposed on one of the TFT substrate 42 and the counter substrate 43. In addition, if the counter substrate 43 has a retardation compensation function or a heat radiation function, the dedicated compensation substrate. 46 or heat radiation substrate 45 may be omitted for achieving the advantages of the present invention.

Figure 5:
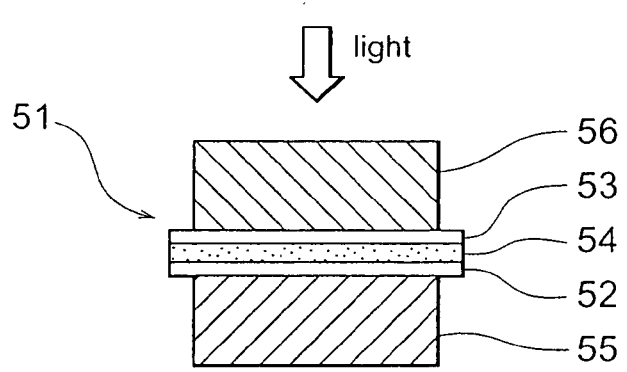
FIG. 5 is a side view of an LCD device according to a fourth embodiment of the present invention.

FIG. 5 shows an LCD device, generally designated by numeral 51, according to a fourth embodiment of the present invention. The LCD device 51 of the present embodiment is similar to the second embodiment except that the LCD device 51 of the present embodiment has smaller thicknesses for the TFT substrate 52 and the counter substrate 53 and larger thicknesses for the heat radiation substrate 56 and the compensation substrate 55 compared to the second embodiment.

A 0.5-mm-thick non-alkali glass having a CTE of $+3.8 \times 10^{-6}$/K is used for the TFT substrate 52 and the counter substrate 53. A 2.0-mm-thick negative-CTE glass having a CTE of $-2.0 \times 10^{-6}$/K is used for the compensation substrate 55, whereas a 2.0-mm-thick high-thermal-conductivity glass having a CTE of $8.0 \times 10^{-6}$/K and a CTC of 14 W/m·K is used as the heat radiation substrate 56.

An LCD projector having the LCD device of the present embodiment had a temperature difference ΔT of about 3 degrees C. between the central area and the peripheral area of the LCD device. The heat radiation substrate 56 provided in the present embodiment suppressed the temperature difference ΔT. The range of variation in the level of the black luminance was as lows as 0.06 to thereby obtain an excellent image quality.

The smaller thickness of the TFT substrate 52 and the counter substrate 53 and the larger thickness of the heat radiation substrate 56 and the compensation substrate 55 achieved effective retardation compensation function and heat radiation function, thereby further improving the image quality of the LCD device. As is the case for the other embodiments, the glasses are not limited to the glasses as recited above, and the arrangement of the compensation substrate and the heat radiation substrate is not limited to the above arrangement.

Figure 6:
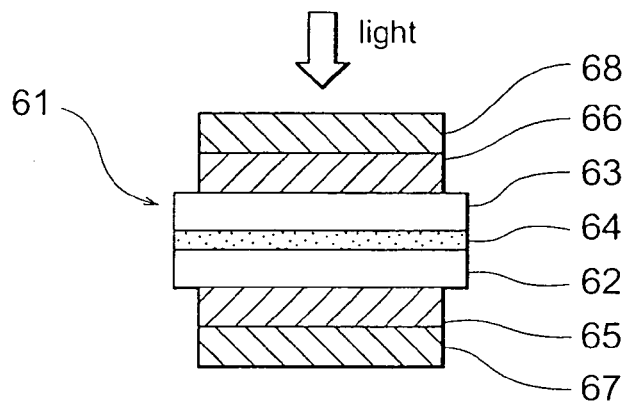
FIG. 6 is a side view of an LCD device according to a fifth embodiment of the present invention.

FIG. 6 shows an LCD device, generally designated by numeral 61, according to a fifth embodiment of the present invention. The LCD device 61 of the present embodiment is similar to the fourth embodiment except that each of the TFT substrate 62 and the counter substrate 63 is provided with both the compensation substrate 65 or 66 and the heat radiation substrate 67 or 68 in the present embodiment, which are attached in this order by an adhesive onto the corresponding substrate 62 or 63.

A 0.7-mm-thick non-alkali glass having a CTE of $+3.8 \times 10^{-6}$/K is used as the TFT substrate 62 and the counter substrate 63, similarly to the first embodiment. A 1.1-mm-thick negative-CTE glass having a CTE of $-2.0 \times 10^{-6}$/K is used for the compensation substrates 65 and 66, whereas a 1.1-mm-thick high-thermal-conductivity glass having a CTE of $8.0 \times 10^{-6}$/K and a CTC of 14 W/m·K is used for the heat radiation substrates 67 and 68.

An LCD projector including the LCD device of the present embodiment had a temperature difference ΔT of about 4 degrees C. between the central area and the peripheral area of the LCD device.

Figure 7:
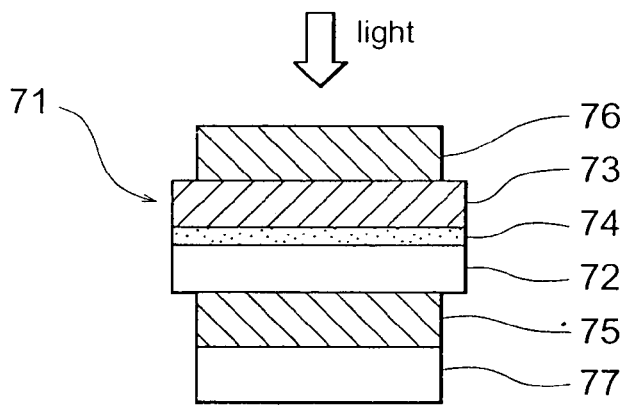
FIG. 7 is a side view of an LCD device according to a sixth embodiment of the present invention.

FIG. 7 shows an LCD device, generally designated by numeral 71, according to a sixth embodiment of the present invention. The LCD device 71 of the present embodiment is similar to the fifth embodiment except that a compensation counter substrate 73 is provided in the present embodiment instead of the counter substrate 63 and the compensation substrates 65 and 66 in the fifth embodiment.

The compensation counter substrate 73 has a function of compensating the retardation. There is a higher selectivity in the glass substrate for the counter substrate because the process conditions for the counter substrate are not sever compared to the TFT substrate. A 1.1-mm-thick negative-CTE glass having a CTE of $-2.0 \times 10^{-6}$/K was used as the compensation counter substrate 73, whereas a 0.7-mm-thick non-alkali glass having a CTE of $+3.8 \times 10^{-6}$/K was used for the TFT substrate 72. A 0.7-mm-thick high-thermal-conductivity glass having a CTE of $8.0 \times 10-6$/K and a CTC of 14 W/m·K is used for the heat radiation substrates 75 and 76.

An LCD projector including the LCD device of the present embodiment had a temperature difference ΔT of about 5 degrees C. between the central area and the peripheral area of the LCD device. The range of variation in the level of black luminance was as low as 0.06 in the present embodiment.

Figure 8:
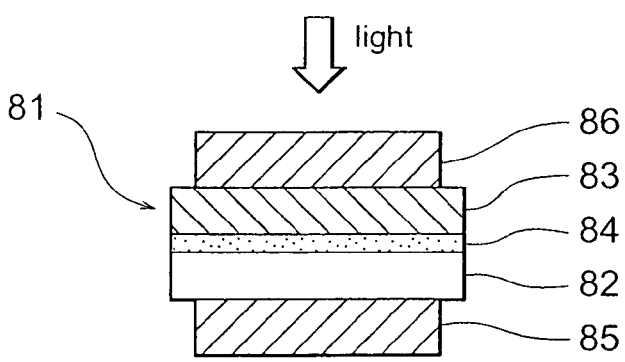
FIG. 8 is a side view of an LCD device according to a seventh embodiment of the present invention.

FIG. 8 shows an LCD device, generally designated by numeral 81, according to a seventh embodiment of the present invention. The LCD device 81 of the present embodiment is similar to the fifth embodiment except that a heat radiation counter substrate 83 is provided in the present embodiment instead of the counter substrate 63 and the heat radiation substrates 66 and 67 in the fifth embodiment.

The heat radiation counter substrate 83 has a function of effectively radiating heat from the LCD device. There is a higher selectivity in the glass substrate for the counter substrate because the process conditions for the counter substrate are not sever compared to the TFT substrate. A 0.7-mm-thick high-thermal-conductivity glass having a CTE of +8.0×10$^{-6}$/K and a CTC of 14 W/m·K was used as the heat radiation counter substrate 83, whereas a 0.7-mm-thick non-alkali glass having a CTE of +3.8×10$^{-6}$/K was used for the TFT substrate 82. A 0.7-mm-thick negative-CTE glass having a CTE of −2.0×10$^{-6}$/K was used for the compensation substrates 85 and 86.

An LCD projector including the LCD device of the present embodiment had a temperature difference ΔT of about 6 degrees C. between the central area and the peripheral area of the LCD device. The range of variation in the level of black luminance was as low as 0.07 in the present embodiment.

In the present embodiment, the non-alkali glass for the TFT substrate 82 may be replaced by another glass. Similarly, the glass for the compensation substrates 85 and 86 may be replaced by another glass so long as the another glass has a CTE and a thickness that satisfy the relationship (2). In addition, a single compensation substrate may be provided on one of the TFT substrate 82 and the heat-radiation counter substrate 83. The heat-radiation counter substrate 83 may have a retardation compensation function instead of providing the dedicated compensation substrates 85 and 86.

Figure 9:
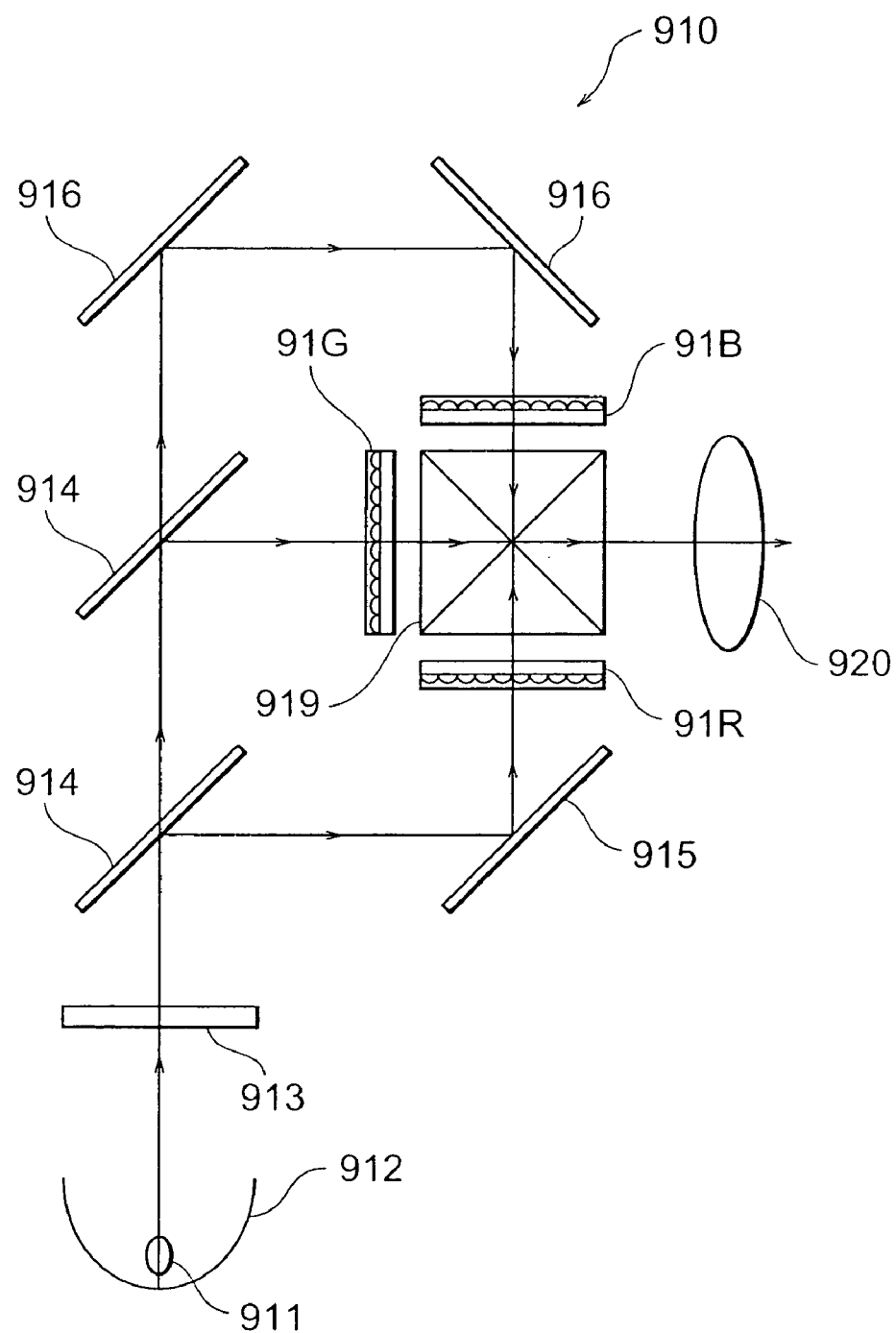
FIG. 9 is a side view of an LCD device according to an eighth embodiment of the present invention.
Figure 10:
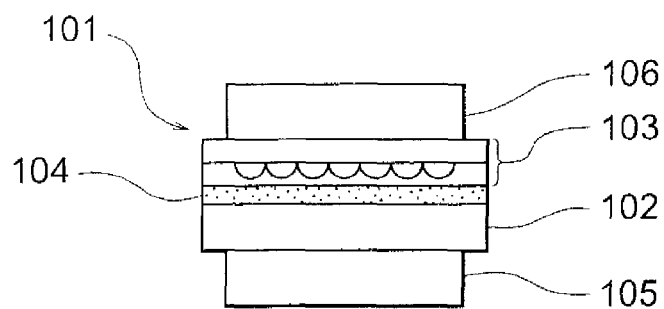
FIG. 10 is a side view of a conventional LCD device described in a patent publication.
Figure 11:
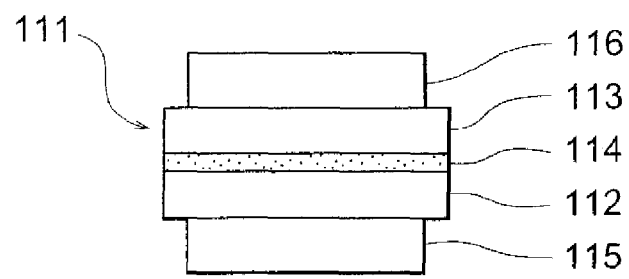
FIG. 11 is a side view of a conventional LCD device described in another patent publication.
Figure 12:
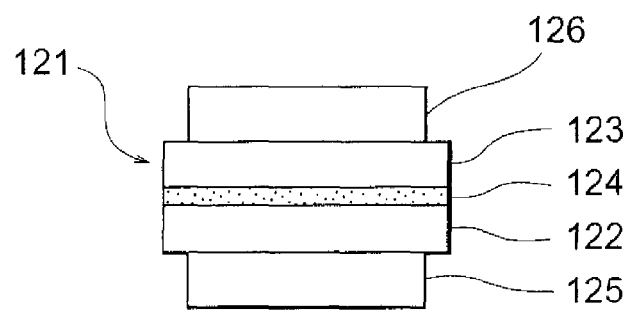
FIG. 12 is a side view of a conventional LCD device described in another patent publication.

FIG. 9 shows an LCD projector, generally designated by numeral 910, according to an eighth embodiment of the present invention. The LCD projector 910 includes a light source including a lamp 911, a reflector 912 and a light conversion integrator 913, a color-separation optical system including dichroic mirrors 914 and reflection mirrors 916 for separating the white light from the light source into three primary colors including red, green and blue, three LCD devices 91R, 91G and 91B for red, green and blue colors, color-synthesis optical system 919 for combining the three primary colors, and a projection lens 920 for projecting the combined light onto a screen while magnifying the image.

Each LCD device 91R, 91G or 91B has a configuration described with reference to one of the first through seventh embodiments. Each LCD device 91R, 91G or 91B also has a micro-lens on the light-incident side thereof for condensing the incident light to increase the luminance. It is to be noted that a pair of polarizing plates are disposed for each of the LCD devices 91R, 91G and 91B, although FIG. 9 does not specifically show the polarizing plates for a simplification purpose.

The TFT of each LCD device 91R, 91G or 91B is driven based on the signal for the pixel in an active-matrix driving scheme. Each of the color-separation optical system 914 to 916 and the color-synthesis optical system 919 may include a dichroic mirror or a dichroic prism.

The LCD projector 910 condenses the light emitted from the lamp 911, allows the condensed light to pass through the light-conversion integrator 913, separates the passed light by using the two dichroic mirrors 914 into light fluxes of the primary colors. The red color flux, green color flux and blue color flux thus separated are incident onto the red, green blue LCD devices 91R, 91G and 91B, respectively. The light (or image) passed through the respective LCD devices 91R, 91G and 91B are synthesized by the dichroic prism 919 to be projected onto the screen after magnification of the image.

Since the above embodiments are described only for examples, the present invention is not limited to the above embodiments and various modifications or alterations can be easily made therefrom by those skilled in the art without departing from the scope of the present invention. For example, the counter substrate need not be a transparent (clear and colorless) substrate.

What is claimed is:

1. A liquid crystal display (LCD) device comprising: a TFT substrate including a transparent substrate mounting thereon thin film transistors; a counter substrate opposing said TFT substrate, a liquid crystal (LC) layer sandwiched between said TFT substrate and said counter substrate; and a compensation substrate disposed adjacent to a surface of one of said TFT substrate and said counter substrate which is far from said LC layer, wherein said compensation substrate has a coefficient of thermal expansion (CTE) having a sign opposite to that of a CTE of said transparent substrate.

2. The LCD device according to claim 1, wherein said CTE of said transparent substrate is not less than +1.0×10$^{-6}$/K.

3. The LCD device according to claim 1, wherein said compensation substrate and said transparent substrate are bonded together to form an integral member.

4. The LCD device according to claim 1, wherein the following relationship:

$$|t_1 \cdot k_1 + t_2 \cdot k_2 + \ldots + t_n \cdot k_n| \leq 10$$

satisfies, given n being the number of substrates included in said LCD device, $t_j$ and $k_j$ being the thickness and the CTE, respectively, of a j-th substrate among said n substrates (j=1, 2, ..., n).

5. The LCD device according to claim 1, further comprising a heat radiation substrate disposed adjacent to a surface of said compensation substrate far from said LC layer.

6. The LCD device according to claim 5, wherein said heat radiation substrate and said compensation substrate are bonded together to form an integral member.

7. The LCD device according to claim 5, wherein the following relationship:

$$|t_1 \cdot k_1 + t_2 \cdot k_2 + \ldots + t_n \cdot k_n| \leq 24$$

satisfies, given n being the number of substrates included in said LCD device, $t_j$ and $k_j$ being the thickness and the CTE, respectively, of a j-th substrate among said n substrates (j=1, 2, ..., n).

8. The LCD device according to claim 1, further comprising a heat radiation substrate disposed adjacent to a surface of the other of said TFT substrate and said counter substrate far from said LC layer.

9. The LCD device according to claim 8, wherein said heat radiation substrate and said the other of said TFT substrate and said counter substrate are bonded together to form an integral member.

10. The LCD device according to claim 8, wherein the following relationship:

$$|t_1 \cdot k_1 + t_2 \cdot k_2 + \ldots + t_n \cdot k_n| \leq 24$$

satisfies, given n being the number of substrates included in the LCD device, $t_j$ and $k_j$ being the thickness and the CTE, respectively, of a j-th substrate among said n substrates (j=1, 2, ..., n).

11. The LCD device according to claim 1, wherein said transparent substrate has a thickness of 1.1 mm or below.

12. The LCD device according to claim 1, wherein said compensation substrate is adhered onto another of substrates with a gel-type adhesive.

13. The LCD device according to claim 12, wherein said gel-type adhesive includes a silicon-based material.

14. The LCD device according to claim 13, wherein said gel-type adhesive has a penetration factor of 60 to 100.

15. The LCD device according to claim 1, wherein said counter substrate has a coefficient of thermal conductivity (CTC) of not smaller than 10 W/m·K.

16. An LCD projector including a light source and an LCD device for passing therethrough light from said light source to project an image onto a screen, said LCD device comprising: a TFT substrate including a transparent substrate mounting thereon thin film transistors; a counter substrate opposing said TFT substrate, a liquid crystal (LC) layer sandwiched between said TFT substrate and said counter substrate; and a compensation substrate disposed adjacent to a surface of one of said TFT substrate and said counter substrate which is far from said LC layer, wherein said compensation substrate has a coefficient of thermal expansion (CTE) having a sign opposite to that of a CTE of said transparent substrate.

* * * * *